(12) United States Patent
Dudley et al.

(10) Patent No.: US 9,960,465 B2
(45) Date of Patent: May 1, 2018

(54) BATTERY PACK

(71) Applicant: LG Chem, Ltd., Seoul (KR)

(72) Inventors: Scott Dudley, Commerce Township, MI (US); Robert Merriman, Shelby Township, MI (US); Heekook Yang, Troy, MI (US); Anthony Arena, Macomb, MI (US)

(73) Assignee: LG Chem, Ltd., Seoul (KR)

( * ) Notice: Subject to any disclaimer, the term of this patent is extended or adjusted under 35 U.S.C. 154(b) by 104 days.

(21) Appl. No.: 14/813,203

(22) Filed: Jul. 30, 2015

(65) Prior Publication Data

US 2017/0033420 A1 Feb. 2, 2017

(51) Int. Cl.
*H01M 10/6563* (2014.01)
*H01M 2/10* (2006.01)
(Continued)

(52) U.S. Cl.
CPC ..... *H01M 10/6563* (2015.04); *H01M 2/1077* (2013.01); *H01M 10/613* (2015.04);
(Continued)

(58) Field of Classification Search
CPC ........ H01M 2/02; H01M 2/1077; H01M 2/04; H01M 2/0456; H01M 6/613; H01M 6/647;
(Continued)

(56) References Cited

U.S. PATENT DOCUMENTS 1,587,425 A 6/1926 Otto
2,210,833 A 8/1940 Clough
(Continued)

FOREIGN PATENT DOCUMENTS

CN 1385917 A 12/2002
CN 101101997 A 1/2008
(Continued)

OTHER PUBLICATIONS

U.S. Appl. No. 14/273,572, filed May 9,2014 entitled Battery Pack and Method of Assembling the Battery Pack.
(Continued)

*Primary Examiner* — Mark F. Huff
*Assistant Examiner* — Omar M Kekia
(74) *Attorney, Agent, or Firm* — Buckert Patent & Trademark Law Firm PC; John F. Buckert

(57) ABSTRACT

A battery pack having a battery module with a bottom surface and a top surface is provided. The battery module includes a plurality of flow channels extending through the battery module from the top surface to the bottom surface. The battery pack includes a base assembly adapted to hold the battery module therein. The base assembly has a bottom wall and a first end and a second end. The bottom surface of the battery module is disposed at an acute angle relative to the bottom wall of the base assembly in a first direction extending from the first end toward the second end. The battery pack includes a cover assembly having a top wall extending substantially parallel to the bottom wall of the base assembly, and a top surface of the battery module that is disposed at an acute angle relative to the top wall of the cover assembly.

13 Claims, 14 Drawing Sheets

(51) Int. Cl.
*H01M 10/6557* (2014.01)
*H01M 10/667* (2014.01)
*H01M 10/613* (2014.01)
*H01M 2/04* (2006.01)
*H01M 10/65* (2014.01)
*H01M 2/02* (2006.01)
*H01M 10/617* (2014.01)
*H01M 10/6556* (2014.01)

(52) U.S. Cl.
CPC ..... *H01M 10/6557* (2015.04); *H01M 10/667* (2015.04); *H01M 2/02* (2013.01); *H01M 2/04* (2013.01); *H01M 2/0456* (2013.01); *H01M 10/617* (2015.04); *H01M 10/65* (2015.04); *H01M 10/6556* (2015.04)

(58) Field of Classification Search
CPC ............ H01M 10/617; H01M 10/65; H01M 10/6551; H01M 10/6563; H01M 10/6556; H01M 10/6557; H01M 10/667; H01M 10/613
USPC ........................................... 429/120
See application file for complete search history.

(56) References Cited

U.S. PATENT DOCUMENTS

| | | | |
|---|---|---|---|
| 4,337,626 A | 7/1982 | Ibrahim | |
| 5,275,012 A | 1/1994 | Dage et al. | |
| 5,586,444 A | 12/1996 | Fung | |
| 5,620,057 A | 4/1997 | Klemen et al. | |
| 5,678,421 A | 10/1997 | Maynard et al. | |
| 5,816,062 A | 10/1998 | Weng et al. | |
| 5,834,132 A | 11/1998 | Hasegawa et al. | |
| 6,703,160 B2 | 3/2004 | Gao | |
| 7,251,954 B2 | 8/2007 | Fee et al. | |
| 7,309,279 B2 | 12/2007 | Sharp et al. | |
| 9,184,424 B2 | 11/2015 | Arena et al. | |
| 2001/0026886 A1 | 10/2001 | Inui et al. | |
| 2001/0054293 A1 | 12/2001 | Gustafson et al. | |
| 2002/0012833 A1 | 1/2002 | Gow et al. | |
| 2002/0073726 A1 | 6/2002 | Hasebe et al. | |
| 2002/0086201 A1 | 7/2002 | Payen et al. | |
| 2002/0182493 A1 | 12/2002 | Ovshinsky et al. | |
| 2003/0017384 A1 | 1/2003 | Marukawa et al. | |
| 2003/0080714 A1 | 5/2003 | Inoue et al. | |
| 2003/0189104 A1 | 10/2003 | Watanabe et al. | |
| 2003/0211384 A1 | 11/2003 | Hamada et al. | |
| 2004/0069474 A1 | 4/2004 | Wu et al. | |
| 2004/0121205 A1 | 6/2004 | Blanchet | |
| 2004/0237550 A1 | 12/2004 | Yamasaki et al. | |
| 2005/0026014 A1 | 2/2005 | Fogaing et al. | |
| 2005/0089750 A1 | 4/2005 | Ng et al. | |
| 2005/0103486 A1 | 5/2005 | Demuth et al. | |
| 2005/0110460 A1 | 5/2005 | Arai et al. | |
| 2005/0111167 A1 | 5/2005 | Yamaguchi et al. | |
| 2005/0134038 A1 | 6/2005 | Walsh | |
| 2006/0093901 A1* | 5/2006 | Lee ................... | H01M 2/1072 429/120 |
| 2006/0234119 A1 | 10/2006 | Kruger et al. | |
| 2006/0286450 A1 | 12/2006 | Yoon et al. | |
| 2007/0012055 A1 | 1/2007 | Schenk et al. | |
| 2007/0062681 A1 | 3/2007 | Beech | |
| 2007/0072066 A1 | 3/2007 | Yoon et al. | |
| 2007/0087266 A1 | 4/2007 | Bourke et al. | |
| 2007/0095073 A1 | 5/2007 | Tian et al. | |
| 2007/0141453 A1 | 6/2007 | Mahalingam et al. | |
| 2007/0209378 A1 | 9/2007 | Larson | |
| 2007/0227166 A1 | 10/2007 | Rafalovich et al. | |
| 2008/0003491 A1 | 1/2008 | Yahnker et al. | |
| 2008/0041079 A1 | 2/2008 | Nishijima et al. | |
| 2008/0090137 A1 | 4/2008 | Buck et al. | |
| 2008/0110189 A1 | 5/2008 | Alston | |
| 2008/0182151 A1 | 7/2008 | Mizusaki et al. | |
| 2008/0226976 A1 | 9/2008 | Stimits | |
| 2009/0061299 A1 | 3/2009 | Uchida et al. | |
| 2009/0142653 A1 | 6/2009 | Okada et al. | |
| 2011/0052960 A1 | 3/2011 | Kwon et al. | |
| 2011/0293982 A1 | 12/2011 | Martz et al. | |
| 2011/0293985 A1 | 12/2011 | Champion et al. | |
| 2012/0040223 A1 | 2/2012 | Odumodu | |
| 2012/0141847 A1 | 6/2012 | Amagai et al. | |
| 2012/0156537 A1 | 6/2012 | Meintschel et al. | |
| 2012/0231316 A1 | 9/2012 | Sohn | |
| 2013/0071720 A1 | 3/2013 | Zahn | |
| 2013/0078487 A1 | 3/2013 | Shin et al. | |
| 2013/0084480 A1 | 4/2013 | Kim et al. | |
| 2013/0189557 A1 | 7/2013 | Haussmann | |
| 2014/0154535 A1* | 6/2014 | Olsson ................ | H01M 2/1264 429/53 |
| 2014/0335390 A1 | 11/2014 | Hwang et al. | |
| 2015/0010801 A1 | 1/2015 | Arena et al. | |
| 2015/0111075 A1 | 4/2015 | Yum et al. | |
| 2015/0207187 A1 | 7/2015 | Beltz et al. | |

FOREIGN PATENT DOCUMENTS

| | | |
|---|---|---|
| CN | 1754279 B | 9/2010 |
| CN | 201859929 U | 6/2011 |
| CN | 102263216 B | 3/2014 |
| CN | 102396098 B | 4/2014 |
| DE | 19639115 A | 3/1998 |
| DE | 102008034860 A1 | 1/2010 |
| DE | 102009006426 A1 | 7/2010 |
| DE | 102010021922 A1 | 12/2011 |
| EP | 1577966 A | 9/2005 |
| EP | 1852925 A | 11/2007 |
| EP | 2065963 A2 | 6/2009 |
| EP | 2200109 A2 | 6/2010 |
| EP | 2262048 A | 12/2010 |
| GB | 481891 A | 3/1938 |
| JP | 08111244 A | 4/1996 |
| JP | H09129213 A | 5/1997 |
| JP | 19970199186 | 7/1997 |
| JP | H09219213 A | 8/1997 |
| JP | 2001023703 | 1/2001 |
| JP | 2001105843 A | 4/2001 |
| JP | 2002038033 A | 2/2002 |
| JP | 2002319383 A | 10/2002 |
| JP | 2002333255 A | 11/2002 |
| JP | 2003188323 A | 7/2003 |
| JP | 2003282112 A | 10/2003 |
| JP | 2004333115 A | 11/2004 |
| JP | 2005126315 A | 5/2005 |
| JP | 2005147443 A | 6/2005 |
| JP | 2005349955 A | 12/2005 |
| JP | 2006512731 | 4/2006 |
| JP | 2006125835 | 5/2006 |
| JP | 2006139928 A | 6/2006 |
| JP | 2007107684 | 4/2007 |
| JP | 2007305425 A | 11/2007 |
| JP | 2008054379 A | 3/2008 |
| JP | 2008062875 A | 3/2008 |
| JP | 2008080995 A | 4/2008 |
| JP | 2008159440 A | 7/2008 |
| JP | 2008251378 | 10/2008 |
| JP | 2009009889 A | 1/2009 |
| JP | 2009054297 A | 3/2009 |
| JP | 2009158316 | 7/2009 |
| JP | 2009238644 | 10/2009 |
| JP | 2012015096 | 10/2009 |
| JP | 2012064555 | 10/2010 |
| JP | 2012018915 | 1/2012 |
| JP | 2013110087 | 6/2013 |
| JP | 2014235900 | 1/2014 |
| KR | 20050092605 A | 9/2005 |
| KR | 100637472 B1 | 10/2006 |
| KR | 100948003 | 8/2007 |
| KR | 100765659 B1 | 10/2007 |
| KR | 20080047641 A | 5/2008 |
| KR | 20090000307 | 1/2009 |
| KR | 20090082212 A | 7/2009 |
| KR | 100921346 B1 | 10/2009 |

(56) References Cited

FOREIGN PATENT DOCUMENTS

| KR | 20090107443 A | 10/2009 | | |
|---|---|---|---|---|
| KR | 101156527 | 6/2010 | | |
| KR | 101069161 | 7/2010 | | |
| KR | 20100119497 A | 9/2010 | | |
| KR | 20100119498 A | 9/2010 | | |
| KR | 20100115709 A | 10/2010 | | |
| KR | 1020100119497 A | 11/2010 | | |
| KR | 1020100119498 A | 11/2010 | | |
| KR | 20110013269 | 2/2011 | | |
| KR | 1020110013269 A | 2/2011 | | |
| KR | 1020110013270 A | 2/2011 | | |
| KR | 20120129384 | 5/2011 | | |
| KR | 20110126764 A | 11/2011 | | |
| KR | 20130018494 | 5/2012 | | |
| KR | 20120088020 | 8/2012 | | |
| KR | 20130024761 | 8/2012 | | |
| KR | 20130017289 | 2/2013 | | |
| KR | 20130073582 | 7/2013 | | |
| KR | 20140010234 | 1/2014 | | |
| KR | 20130033531 | 4/2014 | | |
| KR | 20140114551 | 9/2014 | | |
| WO | WO 2007/097594 | * 8/2007 | ............ | H01M 2/10 |
| WO | 2011146919 A2 | 11/2011 | | |
| WO | 2011147550 A1 | 12/2011 | | |
| WO | 2013025608 A1 | 2/2013 | | |
| WO | 2013081396 A1 | 6/2013 | | |

OTHER PUBLICATIONS

U.S. Appl. No. 14/328,000, filed Jul. 10, 2014 entitled Battery System and Method of Assembling the Battery System.
U.S. Appl. No. 14/330,163, filed Jul. 14, 2014 entitled Battery System and Method for Cooling the Battery System.
U.S. Appl. No. 14/511,389, filed Oct. 10, 2014 entitled Battery Cell Assembly.
U.S. Appl. No. 14/531,696, filed Nov. 3, 2014 entitled Battery Pack. "Gasket". Merriam-Webster. Merriam-Webster. Web. May 30, 2012. <http://www.merriam-webster.com/dictionary/gasket>.
International Search Report for International application No. PCT/KR2013/004015 dated Sep. 26, 2013.
International Search Report; International Application No. PCT/KR2009/000258; International Filing Date: Jan. 16, 2009; dated Aug. 28, 2009; 2 pages.
International Search Report; International Application No. PCT/KR2009/003428, International Filing Date: Jun. 25, 2009; dated Jan. 22, 2010; 2 pages.
International Search Report; International Application No. PCT/KR2009/003429; International Filing Date: Jun. 25, 2009; dated Jan. 12, 2010; 3 pages.
International Search Report; International Application No. PCT/KR2009/003430; International Filing Date: Jun. 25, 2009; dated Feb. 3, 2010; 2 pages.
International Search Report; International Application No. PCT/KR2009/003434; International Filing Date: Jun. 25, 2009; dated Jan. 18, 2010; 2 pages.
International Search Report; International Application No. PCT/KR2009/003436; International Filing Date: Jun. 25, 2009; dated Jan. 22, 2010; 2 pages.
International Search Report; International Application No. PCT/KR2009/006121; International Filing Date: Oct. 22, 2009; dated May 3, 2010; 2 pages.
International Search Report; International Application No. PCT/KR2010/002334; International Filing Date: Apr. 15, 2010; dated Nov. 29, 2010; 2 pages.
International Search Report; International Application No. PCT/KR2010/002336; International Filing Date: Apr. 15, 2010; dated Jan. 31, 2011; 2 pages.
International Search Report; International Application No. PCT/KR2010/002337; International Filing Date: Apr. 15, 2010; dated May 3, 2010; 2 pages.
International Search Report; International Application No. PCT/KR2010/002340; International Filing Date: Apr. 15, 2010; dated Jan. 31, 2011; 2 pages.
International Search Report; International Application No. PCT/KR2010/004944; International Filing Date: Jul. 28, 2010; dated Apr. 29, 2011; 2 pages.
International Search Report; International Application No. PCT/KR2010/005639; International Filing Date: Aug. 24, 2010; dated Jun. 3, 2011; 2 pages.

* cited by examiner

BATTERY PACK

BACKGROUND

The inventors herein have recognized a need for a battery pack having a reduced longitudinal length and having substantially equal air flow through a plurality of flow channels in each battery module of the battery pack.

SUMMARY

A battery pack in accordance with an exemplary embodiment is provided. The battery pack includes a battery module having a bottom surface and a top surface. The battery module further includes a plurality of flow channels extending through the battery module from the top surface to the bottom surface. The battery pack further includes a base assembly adapted to hold the battery module therein. The base assembly has a bottom wall and a first end and a second end. The bottom surface of the battery module is disposed at an acute angle relative to the bottom wall of the base assembly in a first direction extending from the first end toward the second end. The battery pack further includes a cover assembly coupled to the base assembly such that a battery module is disposed within an interior region defined by the cover assembly and the base assembly. The cover assembly has a top wall extending substantially parallel to the bottom wall of the base assembly, and a top surface of the battery module that is disposed at an acute angle relative to the top wall of the cover assembly in a second direction opposite to the first direction. A first flow path is defined between the top surface of the battery module and the top wall of the cover assembly. A second flow path is at least partially defined between the bottom wall of the base assembly and the bottom surface of the battery module. The battery pack further includes an electric fan assembly that is disposed in the interior region and fluidly communicates with the second flow path. The electric fan assembly is adapted to urge air to flow through an inlet aperture of the cover assembly, and through the first flow path, and the plurality of flow channels of the battery module, and the second flow path, and to exit an outlet aperture of the cover assembly.

DETAILED DESCRIPTION

Figure 1:
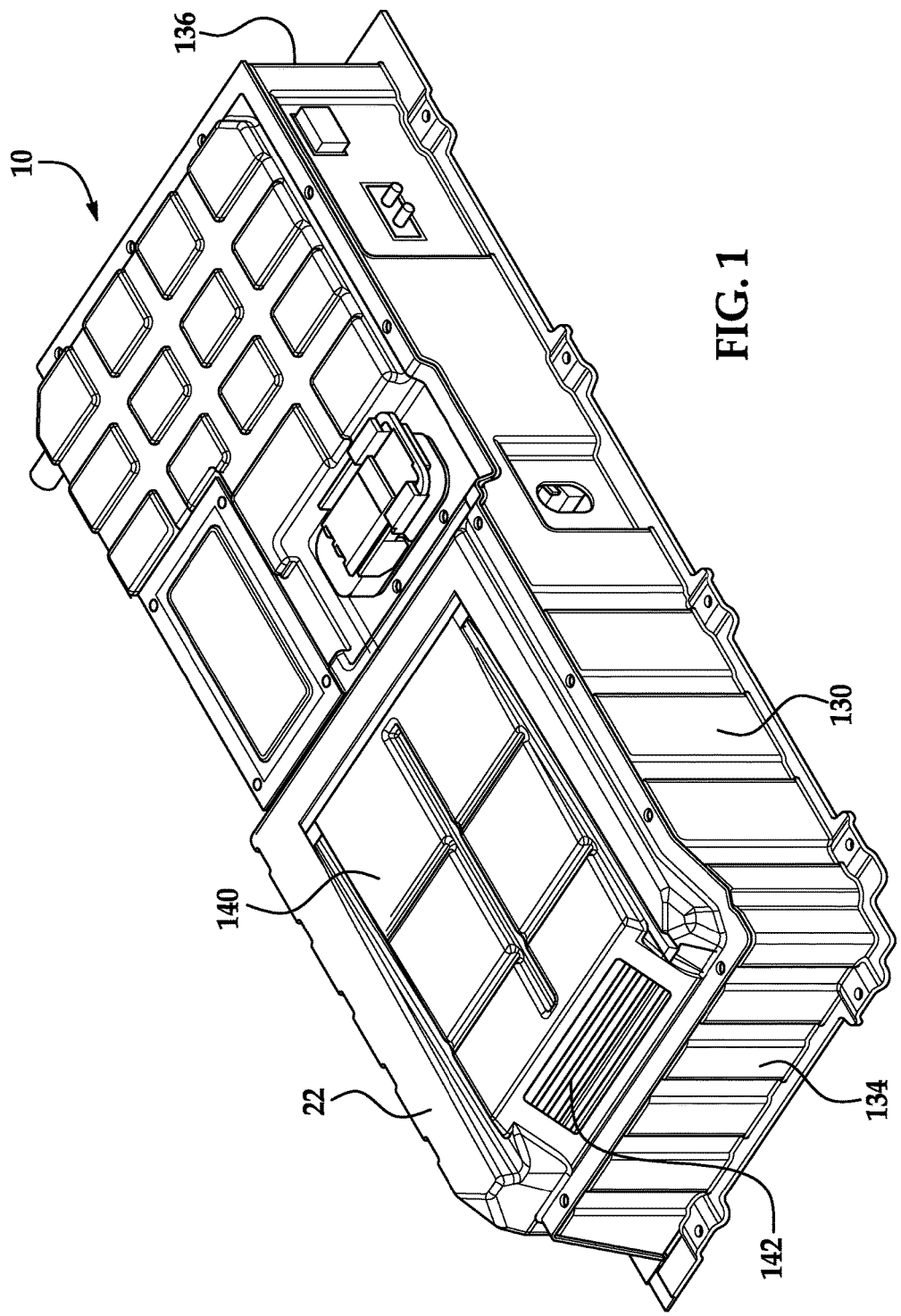
FIG. 1 is a schematic of a battery pack in accordance with an exemplary embodiment.

Referring to FIGS. 1-4, a battery pack 10 in accordance with an exemplary embodiment is provided. The battery pack 10 includes a base assembly 20, a cover assembly 22, battery modules 26, 28, 30, a flow manifold 36, an electric fan assembly 38, and an electronic assembly 40. An advantage of the battery pack 10 is that the battery pack 10 utilizes the battery modules 26, 28, 30 that are disposed at an acute angle relative to a base assembly 20 which reduces a longitudinal length of the battery pack 10. Another advantage of the battery pack 10 is that the battery pack 10 has a substantially equal air flow through each flow channel of a plurality of flow channels in each of the battery modules 26, 28, 30 for equally cooling the battery modules 26, 28, 30.

Figure 2:
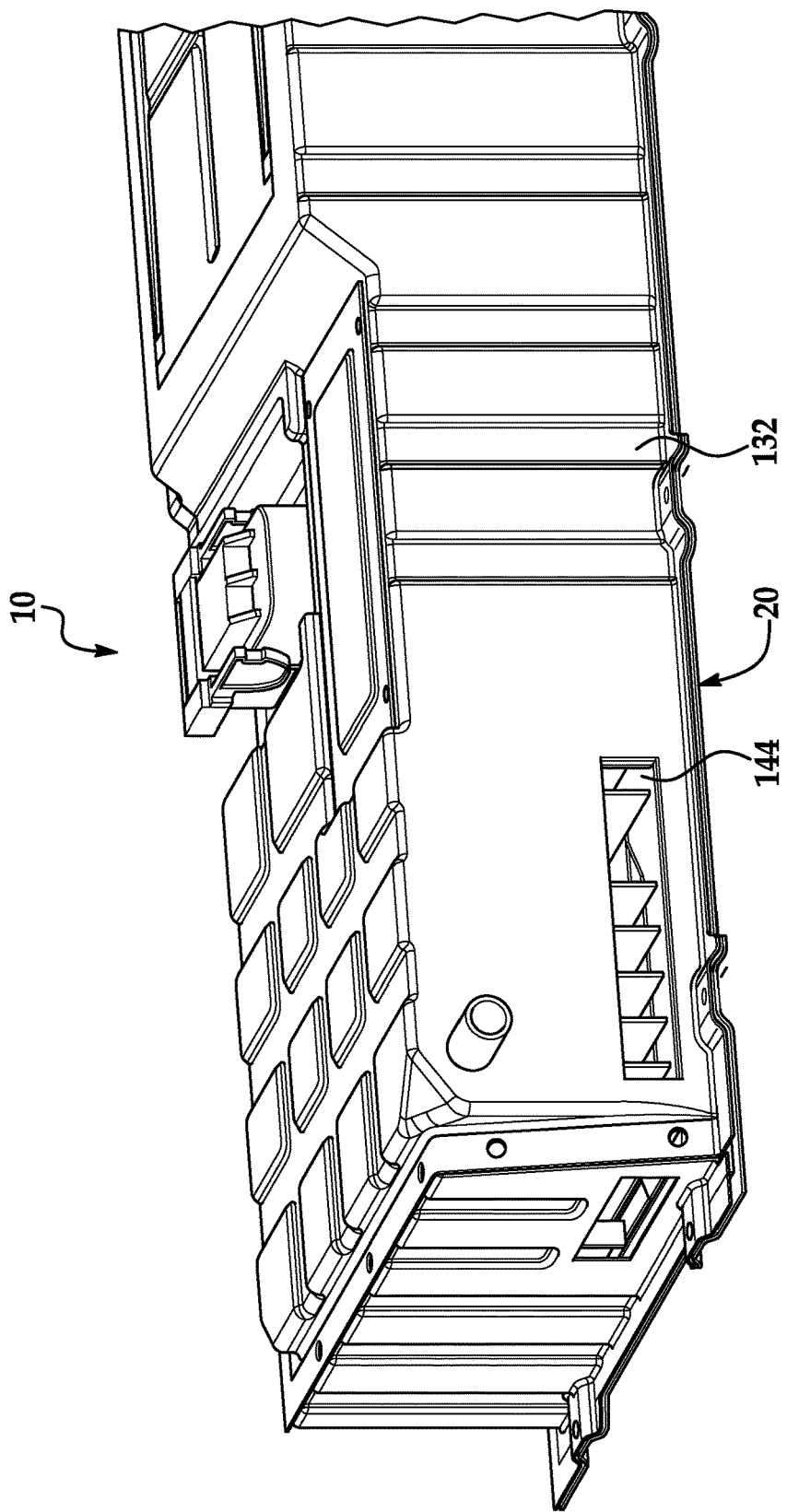
FIG. 2 is a schematic of a portion of the battery pack of FIG. 1.
Figure 3:
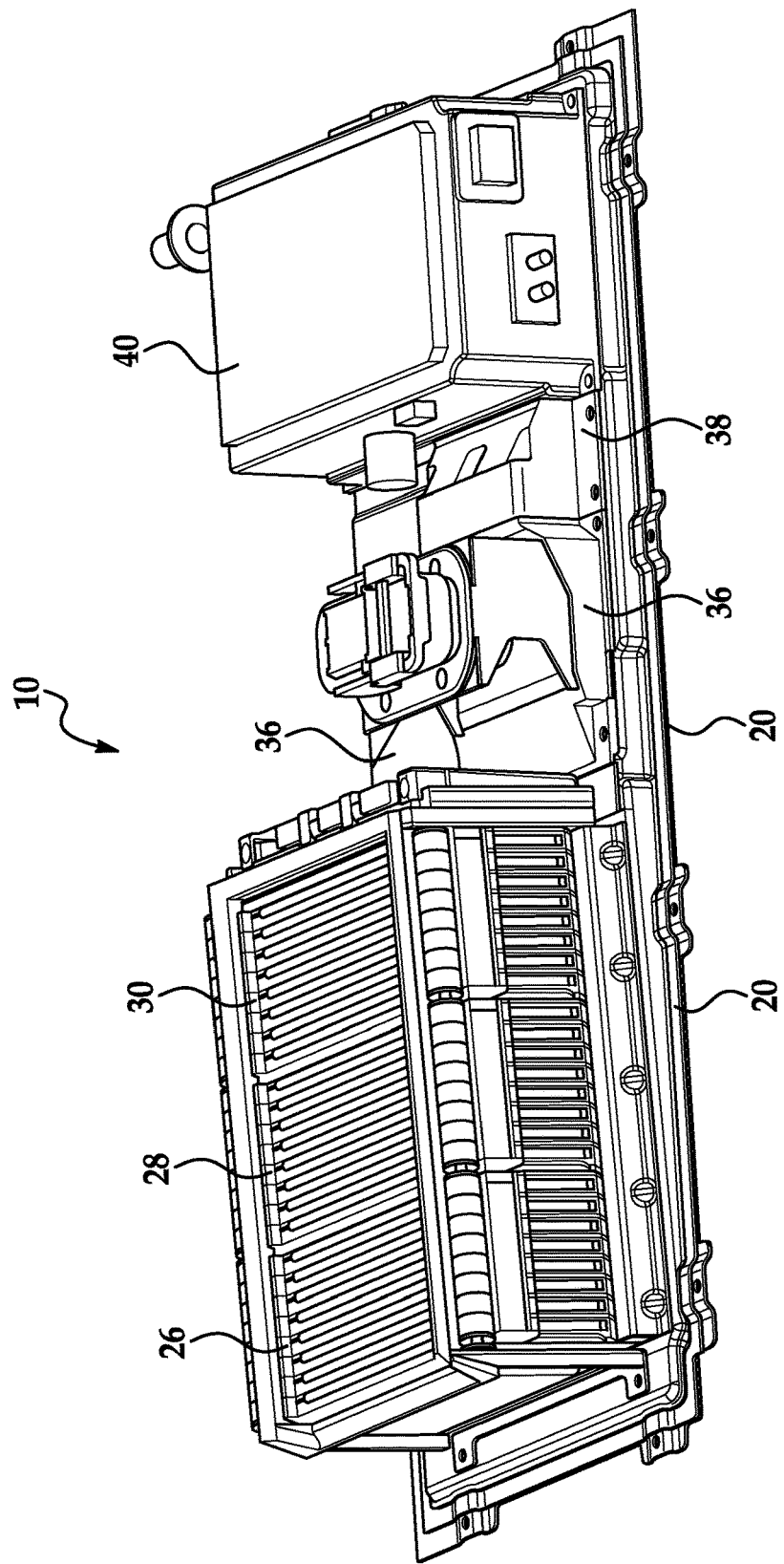
FIG. 3 is a schematic of another portion of the battery pack of FIG. 1.
Figure 4:
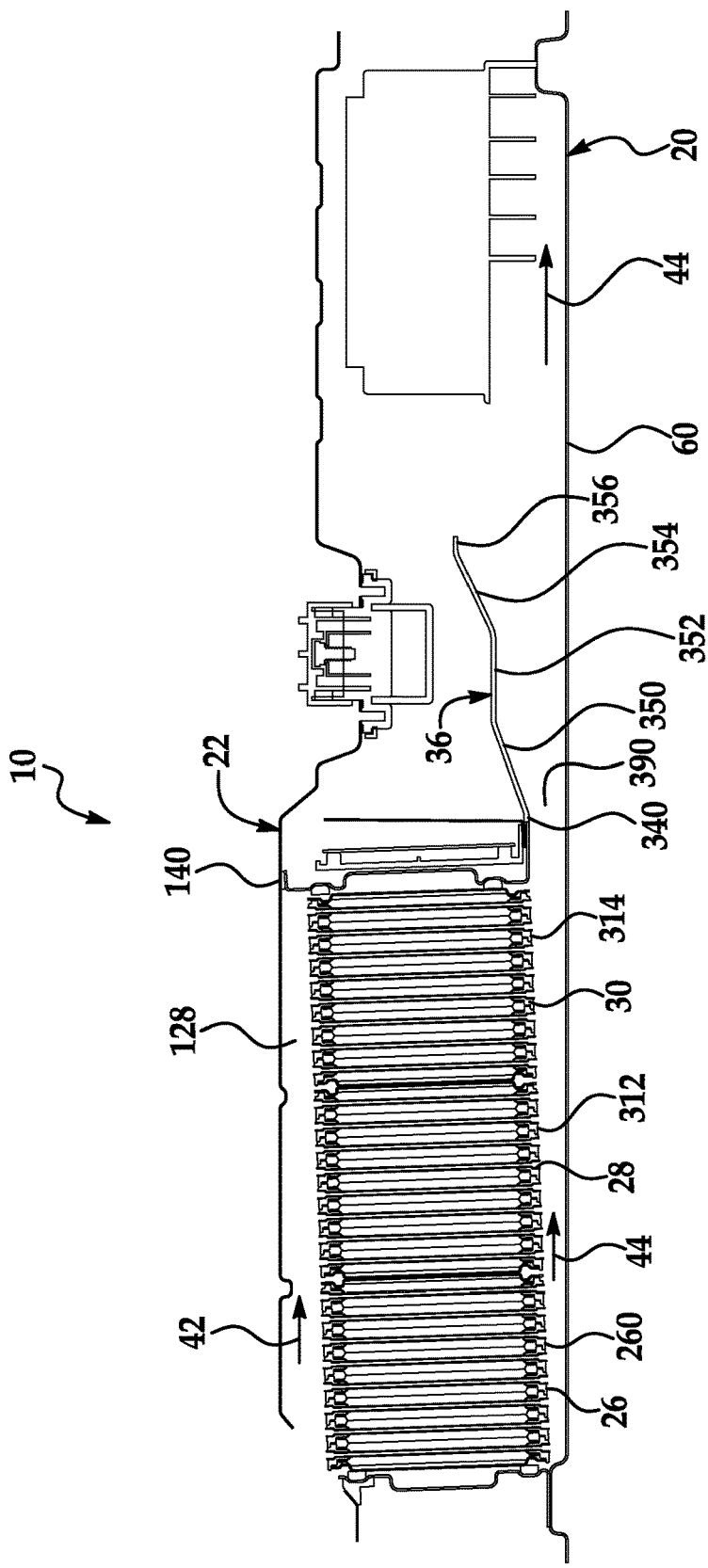
FIG. 4 is a cross-sectional schematic of the battery pack of FIG. 1.

Referring to FIGS. 1, 2 and 4, the battery pack 10 includes a flow path 42 and a flow path 44 therein. Air enters an inlet aperture 142 (shown in FIG. 1) of the battery pack 10, and flows along the flow path 42, and then through flow channels in the battery modules 26, 28, 30, and then along the flow path 44 and exits an outlet aperture 144 (shown in FIG. 2) of the battery pack 10. During operation, the air flowing through the battery pack 10 cools the battery modules 26, 20, 30 and the electronic assembly 40.

Referring to FIGS. 3, 4 and 6-8, the base assembly 20 is provided to hold the cover assembly 22, the battery modules 26, 28, 30, the flow manifold 36, the electric fan assembly 38 and the electronic assembly 40 thereon. The base assembly 20 comprises a sheet member 58 having a bottom wall 60, first and second upwardly slanted top walls 62, 64, first and second inner side walls 68, 70, first and second inner end walls 72, 74, first and second top end walls 75, 76, first and second substantially flat top walls 80, 82, peripheral outer side walls 90, 91, 92, 93, and peripheral lips 94, 95, 96, 97. The base assembly 20 further includes a first end 100 and a second end 102. In an exemplary embodiment, the base assembly 20 is constructed of steel or aluminum. In an alternative embodiment, the base assembly 20 is constructed of plastic.

The first and second upwardly slanted top walls 62, 64 are disposed apart from one another and extend in a first direction. The first direction extends from the first end 100 toward the second end 102. The first and second upwardly slanted top walls 62, 64 further extend at an acute angle relative to the bottom wall 60.

The bottom wall 60 is disposed between the first and second upwardly slanted top walls 62, 64 and extends in the first direction.

The first inner side wall 68 is coupled to and between the bottom wall 60 and the first upwardly slanted top wall 62. The first inner side wall 68 is further coupled to and between the bottom wall 60 and the first substantially flat top wall 80.

The second inner side wall 70 is coupled to and between the bottom wall 60 and the second upwardly slanted top wall 64. The second inner side wall 70 is further coupled to and between the bottom wall 60 and the second substantially flat top wall 82.

The bottom wall 60 and the first and second inner side walls 68, 70 define a portion of the flow path 44 (shown in FIG. 4) therebetween.

The first inner end wall 72 is coupled to and disposed between the first and second inner side walls 68, 70 proximate to the first end 100. The second inner end wall 74 is coupled to and disposed between the first and second inner side walls 68, 70 proximate to the second end 102.

The first top end wall 75 is coupled to a disposed between the first inner end wall 72 and the peripheral outer side wall 92 proximate to the first end 100. The second top end wall 76 is coupled to and disposed between the second inner end wall 74 and the peripheral outer side wall 93 proximate to the second end 102.

The first and second substantially flat top walls 80, 82 extend from the first and second upwardly slanted top walls 62, 64, respectively, substantially in the first direction. The first and second substantially flat top walls 80, 82 are substantially parallel to the bottom wall 60.

The peripheral outer side wall 90 is coupled to and disposed between the first upwardly slanted top wall 62 and the peripheral lip 94. The peripheral outer side wall 90 is further coupled to and disposed between the first substantially flat top wall 80 and the peripheral lip 94.

The peripheral outer side wall 91 is coupled to and disposed between the second upwardly slanted top wall 64 and the peripheral lip 95. The peripheral outer side wall 91 is further coupled to and disposed between the second substantially flat top wall 82 and the peripheral lip 95.

The peripheral outer side wall 92 is coupled to and disposed between the first top end wall 75 and the peripheral lip 96. The peripheral outer side wall 93 is coupled to and disposed between the second top end wall 76 and the peripheral lip 97.

The peripheral lip 94 is coupled to and disposed substantially perpendicular to the peripheral outer side wall 90. Further, the peripheral lip 95 is coupled to and disposed substantially perpendicular to the peripheral outer side wall 91. Also, the peripheral lip 96 is coupled to and disposed substantially perpendicular to the peripheral outer side wall 92. Finally, the peripheral lip 97 is coupled to and disposed substantially perpendicular to the peripheral outer side wall 93.

Referring to FIGS. 1, 2 and 4, the cover assembly 22 is removably coupled to the base assembly 20 such that interior region 128 is defined between the base assembly 20 and the cover assembly 22. In an exemplary embodiment, the cover assembly 22 is constructed of steel or aluminum. In an alternative embodiment, the cover assembly 22 is constructed of plastic. The cover assembly 22 includes side walls 130, 132, 134, 136 and a top wall 142. The side walls 130, 132 are disposed substantially parallel to one another and extend from first and second ends, respectively, of the top wall 142. The side walls 134, 136 are disposed substantially parallel to one another extend from third and fourth ends, respectively, of the top wall 142. The top wall 142 includes an inlet aperture 142 extending therethrough for allowing external air to enter the interior region 128 of the battery pack 10. Further, the side wall 132 includes an outlet aperture 144 for allowing air within the interior region 128 to exit the battery pack 10.

Referring to FIGS. 1, 2 and 4-6, the battery module 26 has a bottom surface 260 that is disposed on the first and second upwardly slanted top walls 62, 64 such that the bottom surface 260 is disposed at the acute angle relative to the bottom wall 60 of the base assembly 20 in a first direction. The first direction extends from the first end 100 toward the second end 102. Further, a plurality of flow channels in the battery module 20 fluidly communicate with the flow path 42 and the flow path 44. The battery module 26 includes frame members 170, 172, 174, 176, 178, 180, 182, 184, battery cells 210, 212, 214, 216, 220, 222, 224, 226, 228, 230, 232, 234, 236, 238, 240, 242, and end plates 250, 252.

Figure 5:
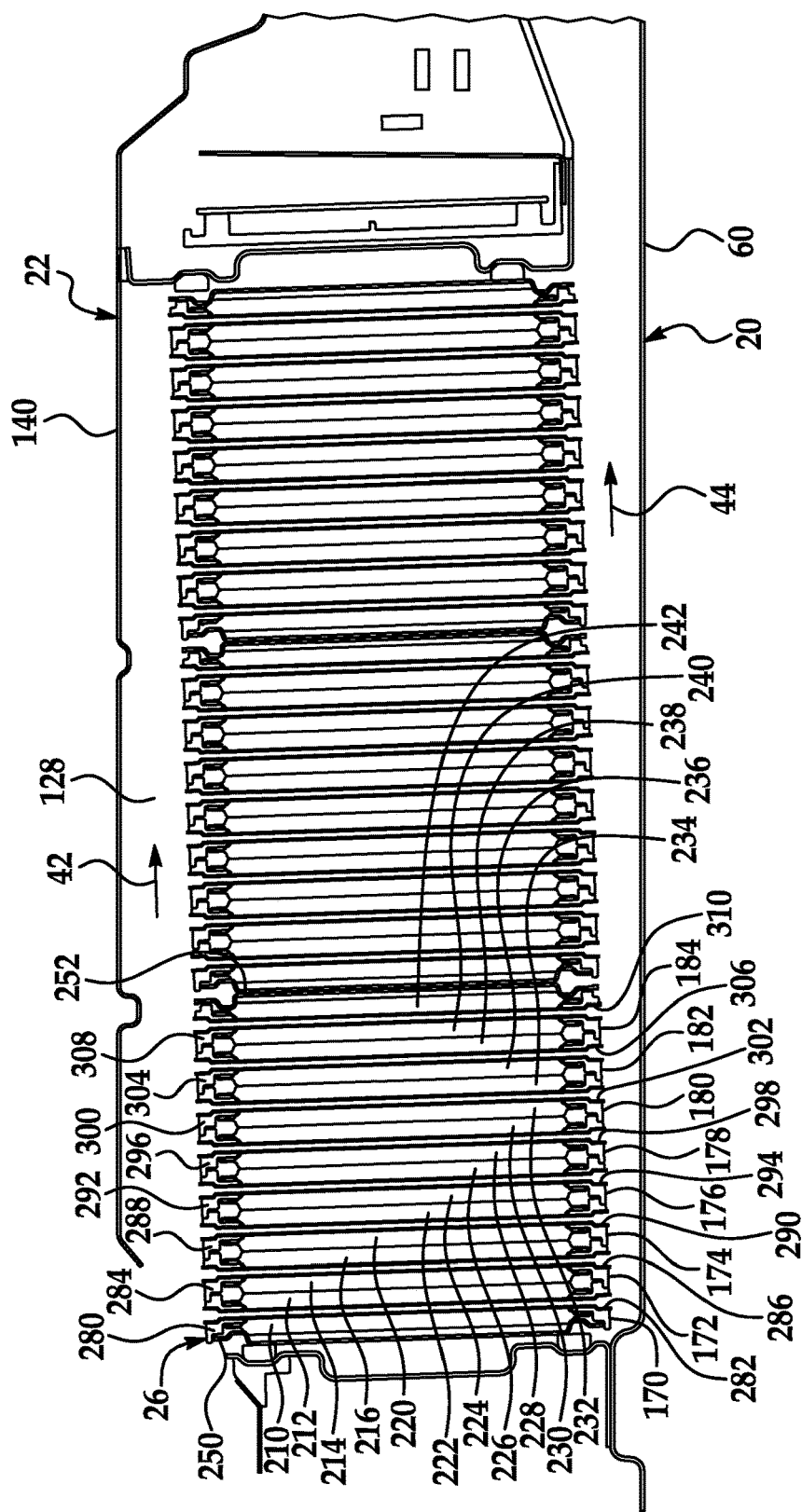
FIG. 5 is an enlarged schematic of a portion of FIG. 4.

Referring to FIGS. 4 and 5, the frame members 170-184 are provided to hold the battery cells 212-240 therebetween. Also, the frame member 170 and the end plate 250 are provided to hold the battery cell 210 therebetween. Further, the frame member 184 and the end plate 252 are provided to hold the battery cell 242 therebetween. The structure of the frame members 170-184 are identical to one another.

The frame member 170 has a substantially rectangular ring-shaped outer plastic frame 280 and a heat exchanger 282. The heat exchanger 282 has a flow channel or flow aperture extending therethrough such that air flows through the flow channel from the flow path 42 to the flow path 44. A first side of the heat exchanger 282 directly contacts the battery cell 210, and a second side of the heat exchanger 282 directly contacts the battery cell 212.

The frame member 172 has a substantially rectangular ring-shaped outer plastic frame 284 and a heat exchanger 286. The heat exchanger 286 has a flow channel or flow aperture extending therethrough such that air flows through the flow channel from the flow path 42 to the flow path 44. A first side of the heat exchanger 286 directly contacts the battery cell 214, and a second side of the heat exchanger 286 directly contacts the battery cell 216.

The frame member 174 has a substantially rectangular ring-shaped outer plastic frame 288 and a heat exchanger 290. The heat exchanger 290 has a flow channel or flow aperture extending therethrough such that air flows through the flow channel from the flow path 42 to the flow path 44. A first side of the heat exchanger 290 directly contacts the battery cell 220, and a second side of the heat exchanger 290 directly contacts the battery cell 222.

The frame member 176 has a substantially rectangular ring-shaped outer plastic frame 292 and a heat exchanger 294. The heat exchanger 294 has a flow channel or flow aperture extending therethrough such that air flows through the flow channel from the flow path 42 to the flow path 44. A first side of the heat exchanger 294 directly contacts the battery cell 224, and a second side of the heat exchanger 290 directly contacts the battery cell 226.

The frame member 178 has a substantially rectangular ring-shaped outer plastic frame 296 and a heat exchanger 298. The heat exchanger 298 has a flow channel or flow aperture extending therethrough such that air flows through the flow channel from the flow path 42 to the flow path 44. A first side of the heat exchanger 298 directly contacts the battery cell 228, and a second side of the heat exchanger 298 directly contacts the battery cell 230.

The frame member 180 has a substantially rectangular ring-shaped outer plastic frame 300 and a heat exchanger 302. The heat exchanger 302 has a flow channel or flow aperture extending therethrough such that air flows through the flow channel from the flow path 42 to the flow path 44. A first side of the heat exchanger 302 directly contacts the battery cell 232, and a second side of the heat exchanger 302 directly contacts the battery cell 234.

The frame member 182 has a substantially rectangular ring-shaped outer plastic frame 304 and a heat exchanger 306. The heat exchanger 306 has a flow channel or flow aperture extending therethrough such that air flows through the flow channel from the flow path 42 to the flow path 44. A first side of the heat exchanger 306 directly contacts the battery cell 236, and a second side of the heat exchanger 306 directly contacts the battery cell 238.

The frame member 184 has a substantially rectangular ring-shaped outer plastic frame 308 and a heat exchanger 310. The heat exchanger 310 has a flow channel or flow aperture extending therethrough such that air flows through the flow channel from the flow path 42 to the flow path 44. A first side of the heat exchanger 310 directly contacts the battery cell 240, and a second side of the heat exchanger 310 directly contacts the battery cell 242.

The battery cells 210-242 are each configured to generate an operational voltage. In an exemplary embodiment, the battery cells 210-242 are pouch-type lithium-ion battery cells that have a substantially rectangular-shaped body portion and a pair of electrical terminals. In an exemplary embodiment, the battery cells 210-242 are electrically coupled in series with one another. In an exemplary embodiment, the structure of the battery cells 210-242 are identical to one another.

Figure 6:
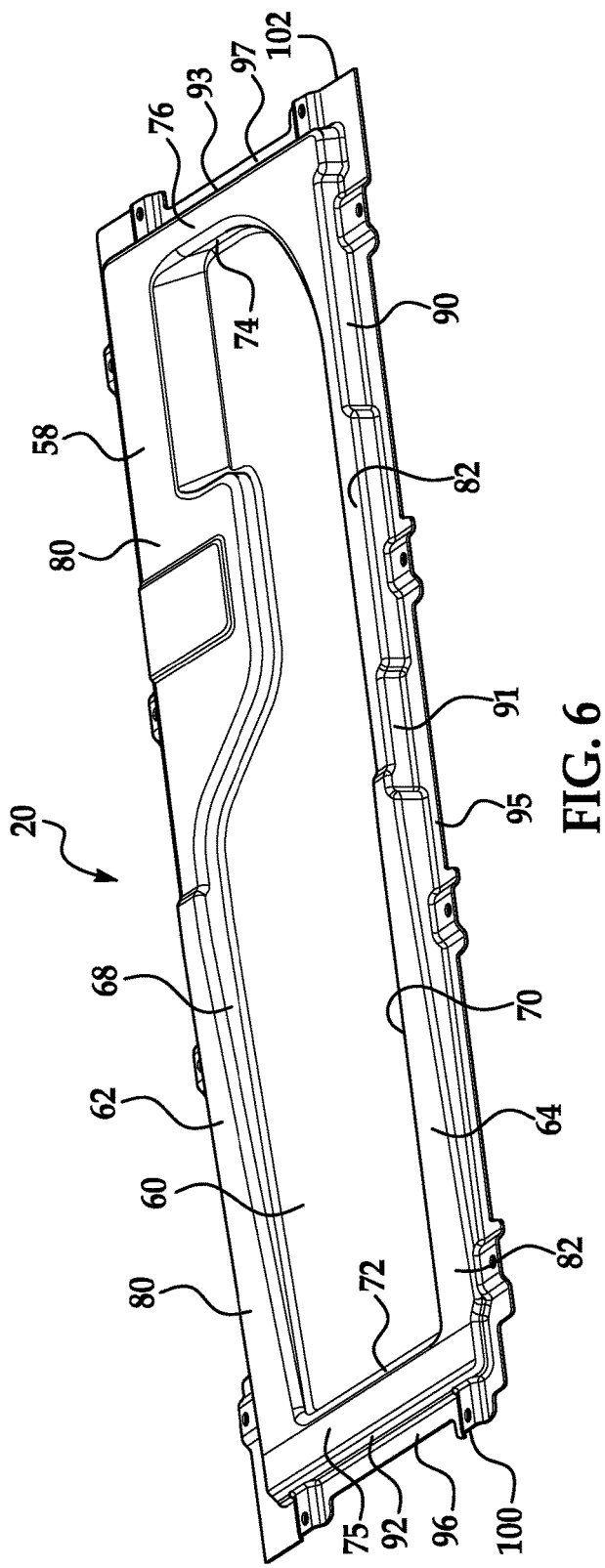
FIG. 6 is a schematic of a base assembly utilized in the battery pack of FIG. 1.
Figure 7:
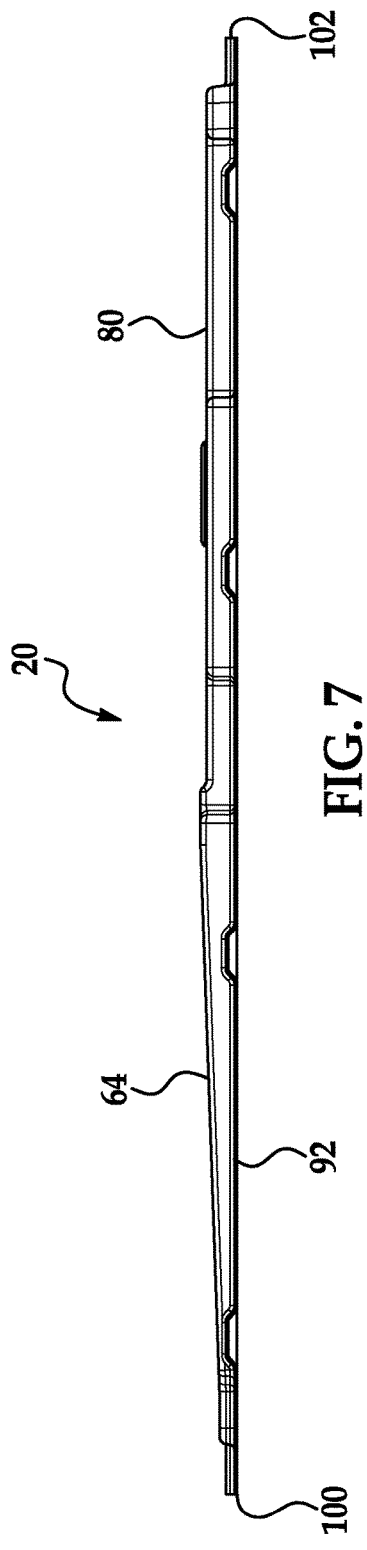
FIG. 7 is a side view of the base assembly of FIG. 6.
Figure 8:
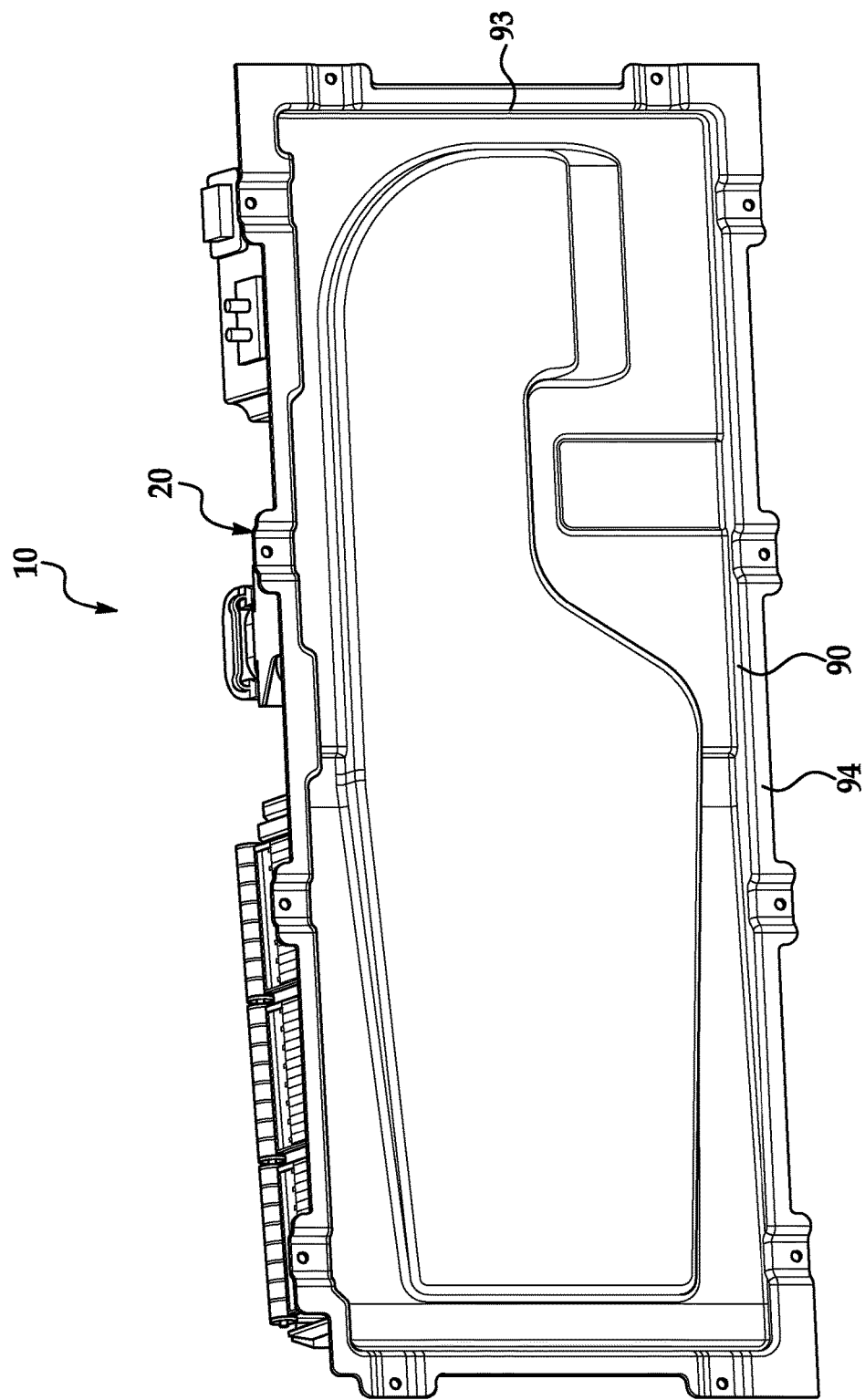
FIG. 8 is a bottom view of a portion of the battery pack of FIG. 1.

Referring to FIGS. 4 and 6, the structure of the battery modules 28 and 30 are identical to the structure of battery module 26. The battery module 28 has a bottom surface 312 that is disposed on the first and second upwardly slanted top walls 62, 64 such that the bottom surface 312 is disposed at the acute angle relative to the bottom wall 60 of the base assembly 20 in a first direction. The first direction extends from the first end 100 toward the second end 102. Further, a plurality of flow channels in the battery module 28 fluidly communicate with the flow path 42 and the flow path 44.

The battery module 30 has a bottom surface 314 that is disposed on the first and second upwardly slanted top walls 62, 64 such that the bottom surface 314 is disposed at the acute angle relative to the bottom wall 60 of the base assembly 20 in a first direction. The first direction extends from the first end 100 toward the second end 102. Further, a plurality of flow channels in the battery module 30 fluidly communicate with the flow path 42 and the flow path 44.

Referring to FIGS. 3, 4, 6, 9, 10, 12 and 13, the flow manifold 36 is provided to route air from the battery modules 26, 28, 30 to the electric fan assembly 38. The flow manifold 36 is disposed on the first and second substantially flat top walls 80, 82 (shown in FIG. 6) of the base assembly 20 between the battery module 30 and the electric fan assembly 38 such that a portion of the flow path 44 extends underneath the flow manifold 36. The flow manifold 36 has a flow manifold inlet 390 (shown in FIGS. 4 and 13) and a flow manifold outlet aperture 392 (shown in FIG. 12). The flow manifold inlet 390 fluidly communicates with the battery module 30. The flow manifold outlet aperture 392 fluidly communicates with the electric fan assembly 38.

Figure 12:
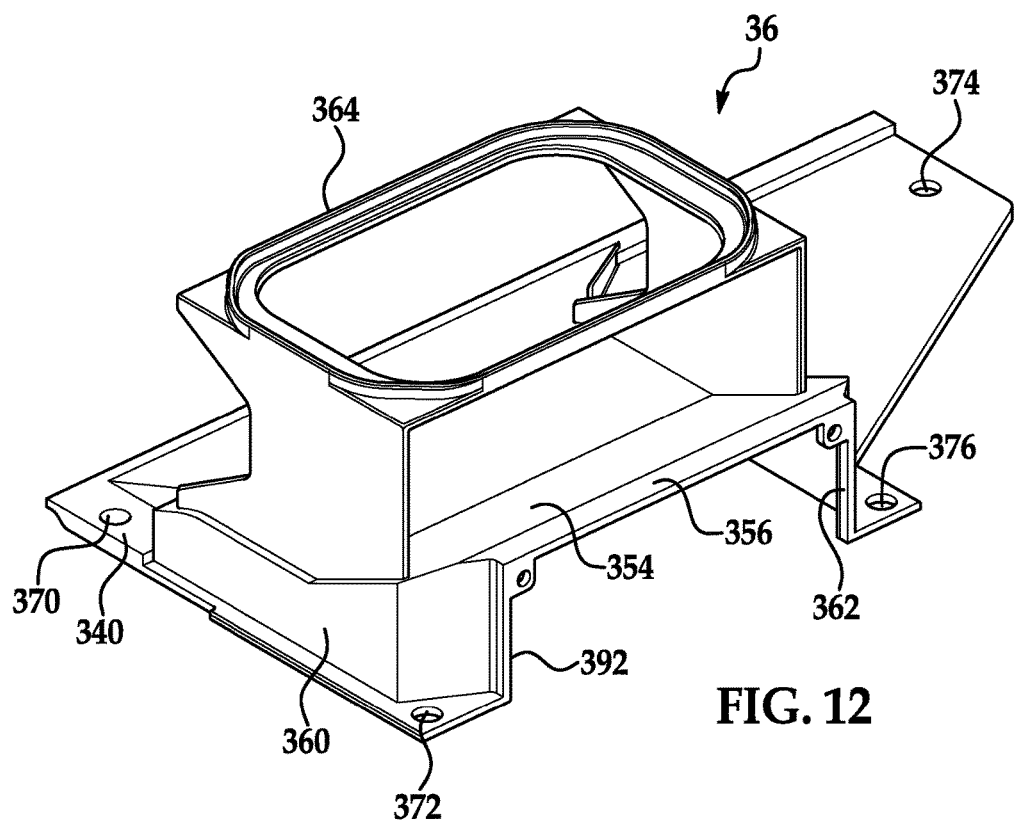
FIG. 12 is a schematic of a flow manifold utilized in the battery pack of FIG. 1.
Figure 13:
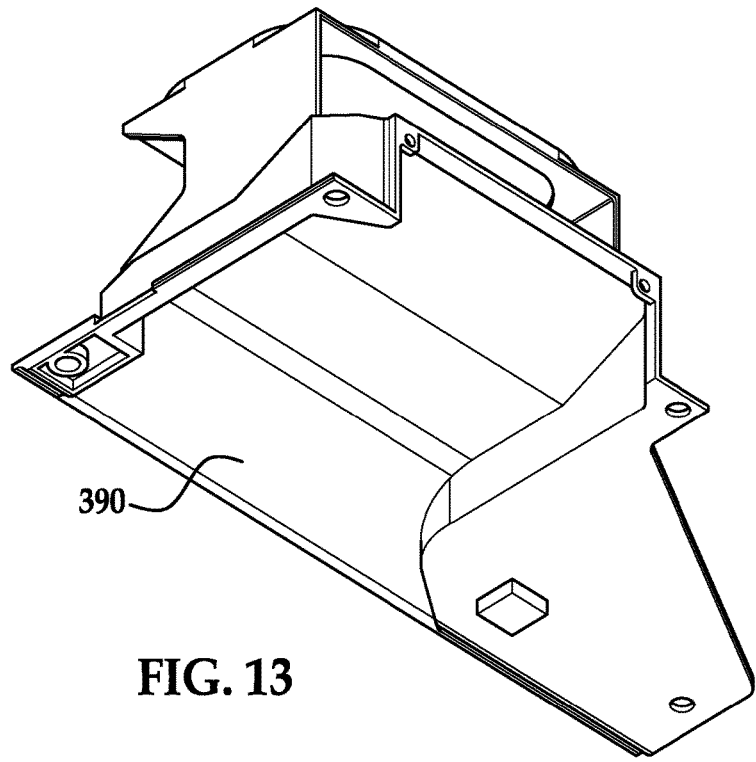
FIG. 13 is another schematic of the flow manifold of FIG. 12.

Referring to FIGS. 4, 12 and 13, the flow manifold 36 includes a base wall 340, top wall portions 350, 352, 354, 356, side walls 360, 362 and a bracket portion 364. The base wall 340 includes apertures 370, 372, 374, 376 extending therethrough for receiving respective bolts for coupling the flow manifold 36 to the base assembly 20. The top wall portions 350, 352, 354, 356 extend upwardly from the base wall 340 in the first direction. The top wall portion 352 is coupled between the top wall portions 350, 354 and extends an acute angle relative to the bottom wall 60 of the base assembly 20. The top wall portion 354 is coupled between the top wall portions 352, 356 and extends an acute angle relative to the bottom wall 60 of the base assembly 20. The side wall 360 is disposed between and is coupled to the base wall 340 and a first side of the top wall portions 350, 352, 354, 356. Also, the side wall 362 is disposed between and is coupled to the base wall 340 and a second side of the top wall portions 350, 352, 354, 356. The side walls 360, 362 and the top wall portion 356 define the flow manifold outlet aperture 392. In an exemplary embodiment, the flow manifold 36 is constructed of plastic. Of course, in an alternative embodiment, the flow manifold 36 could be constructed of other materials such as aluminum, steel, or stainless steel for example.

Figure 9:
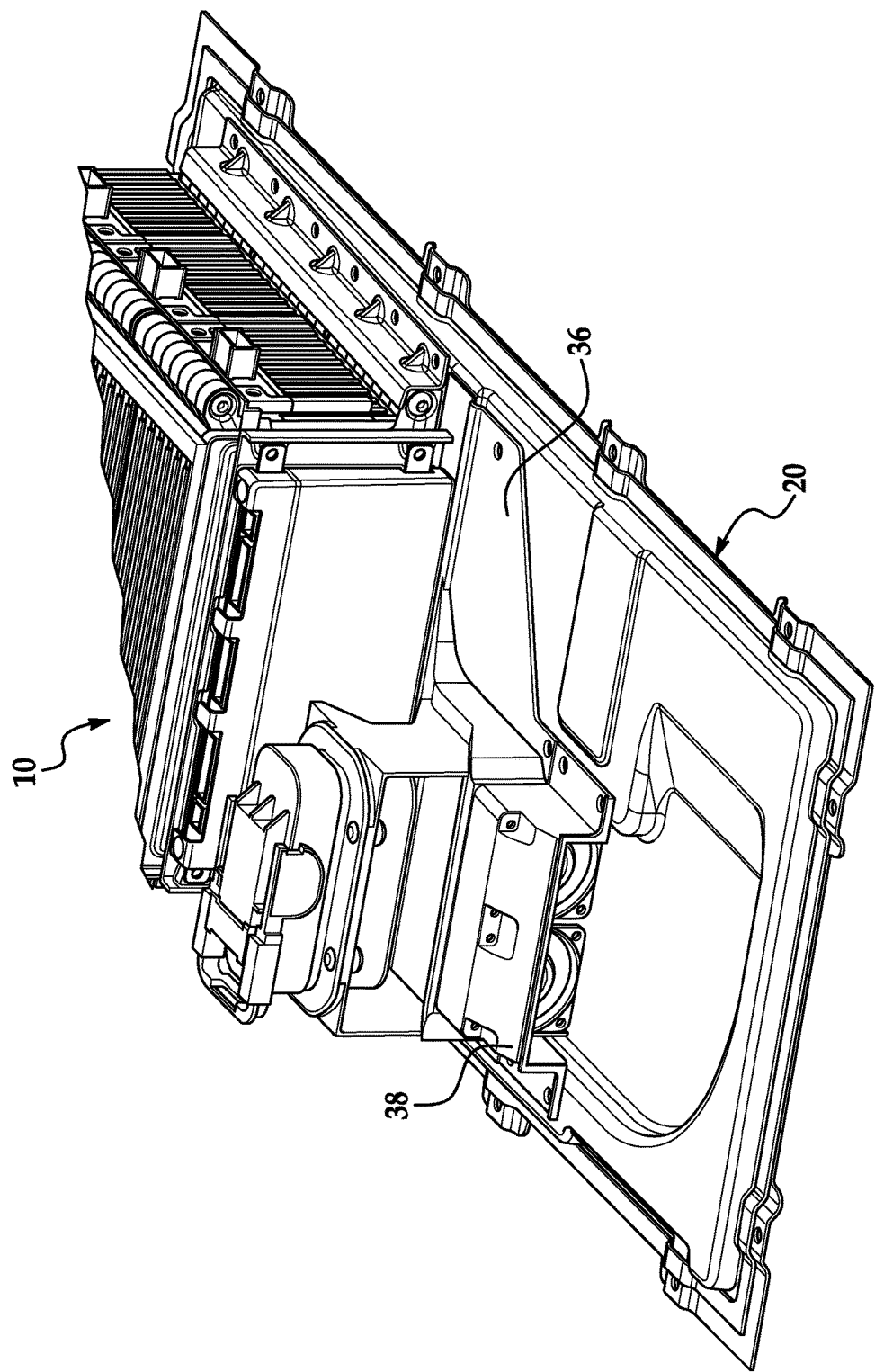
FIG. 9 is a schematic of another portion of the battery pack of FIG. 1.
Figure 10:
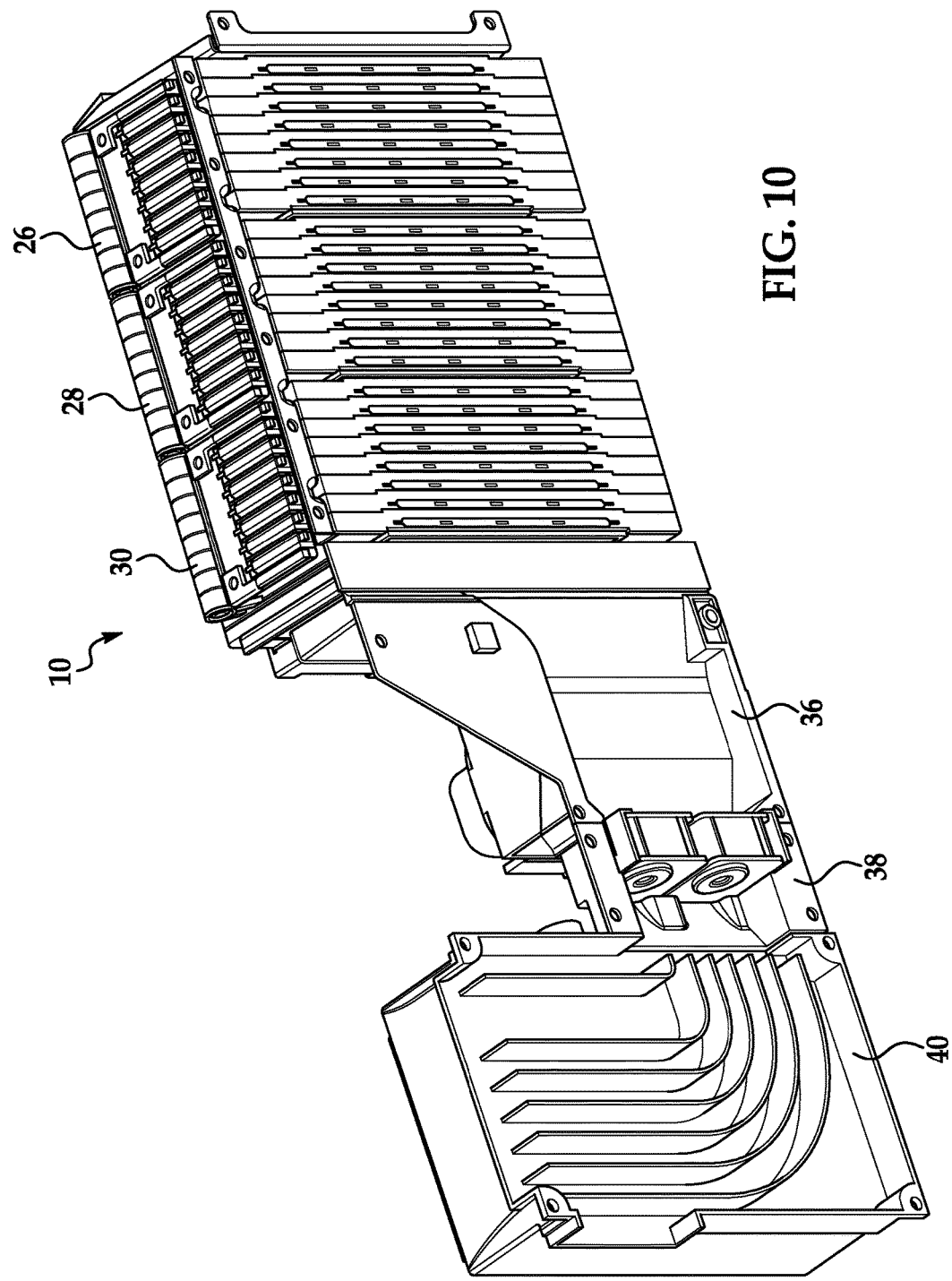
FIG. 10 is a schematic of another portion of the battery pack of FIG. 1.
Figure 11:
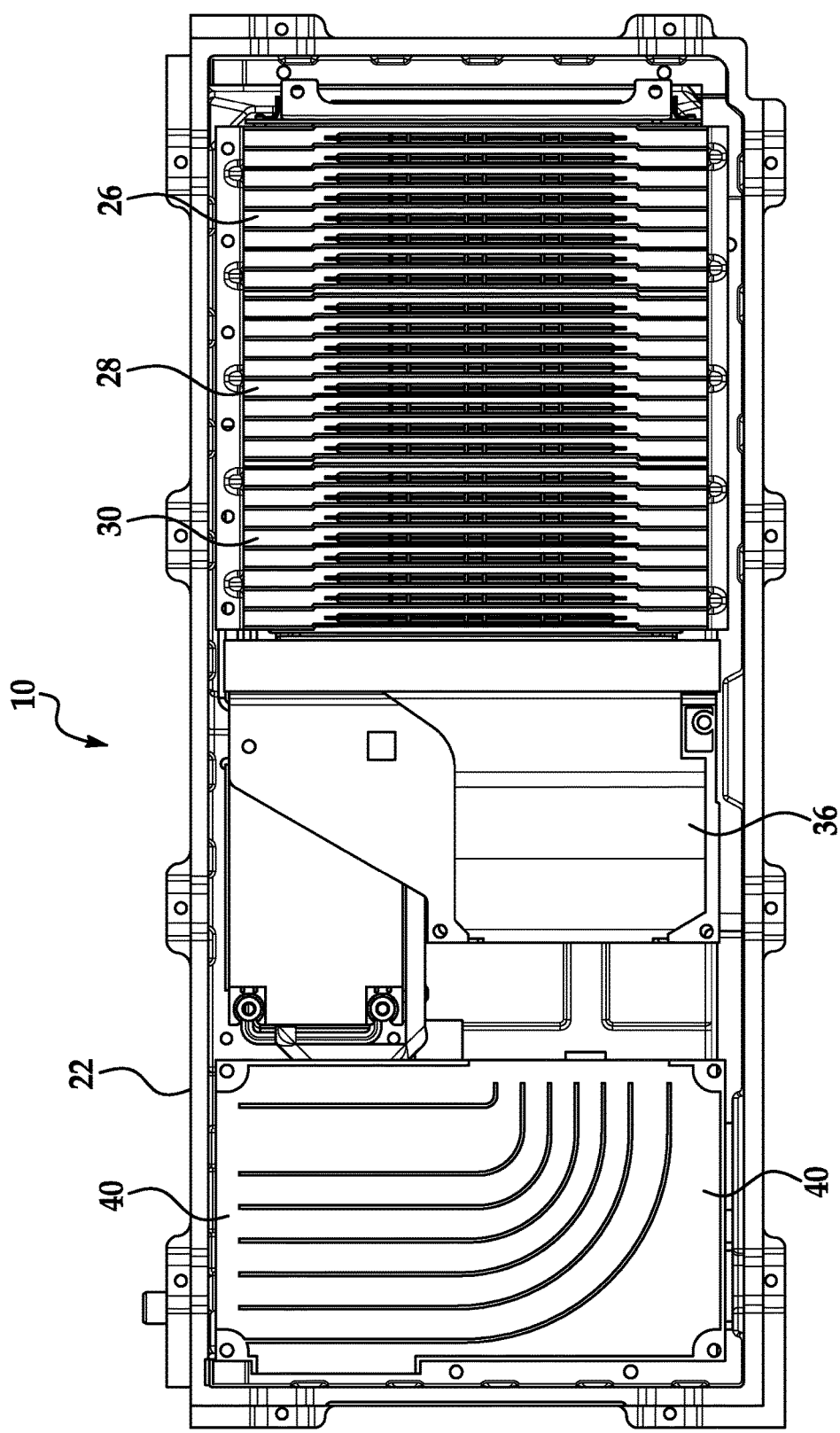
FIG. 11 is a bottom view of a portion of the battery pack of FIG. 1.
Figure 14:
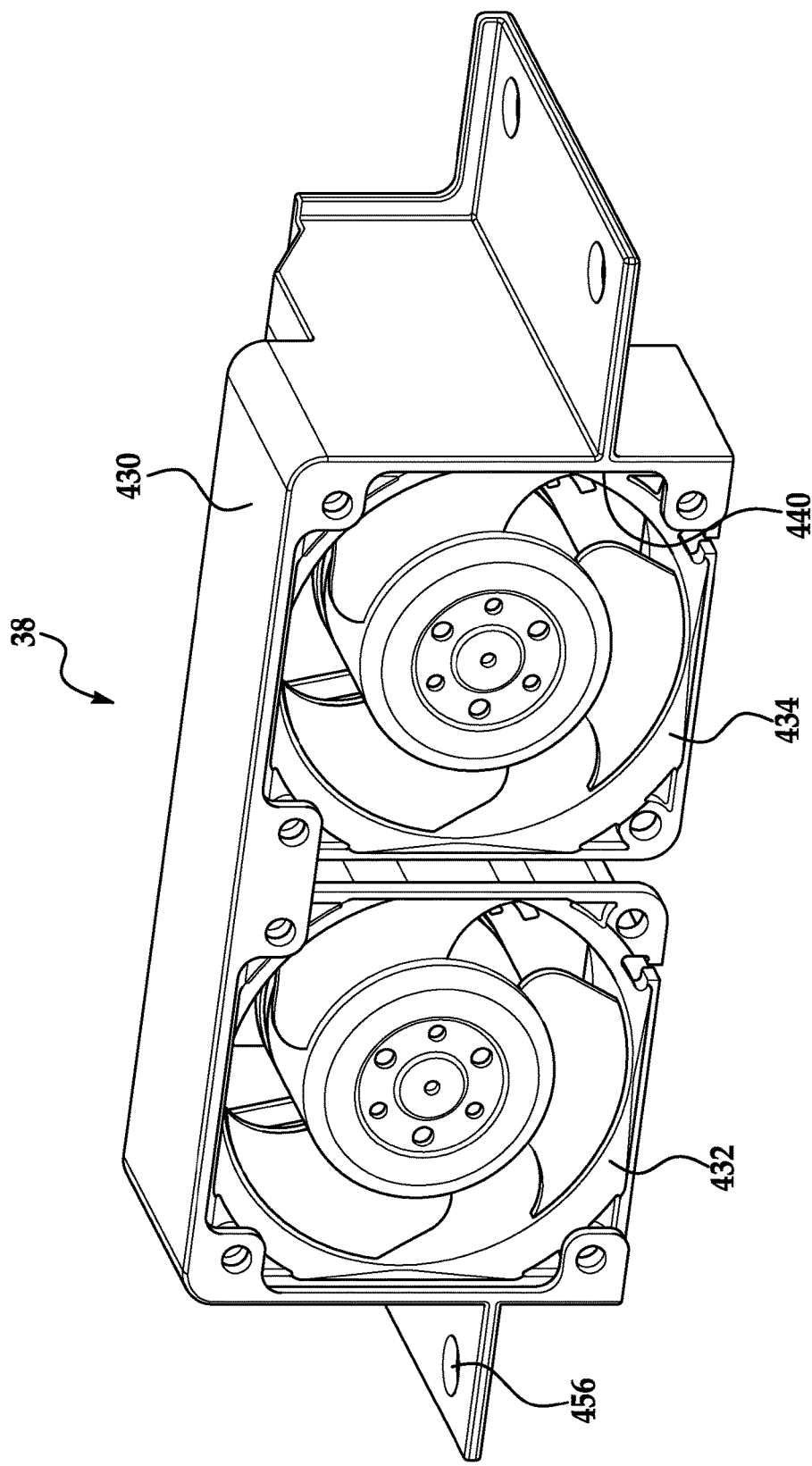
FIG. 14 is a schematic of an electric fan assembly utilized in the battery pack of FIG. 1.
Figure 15:
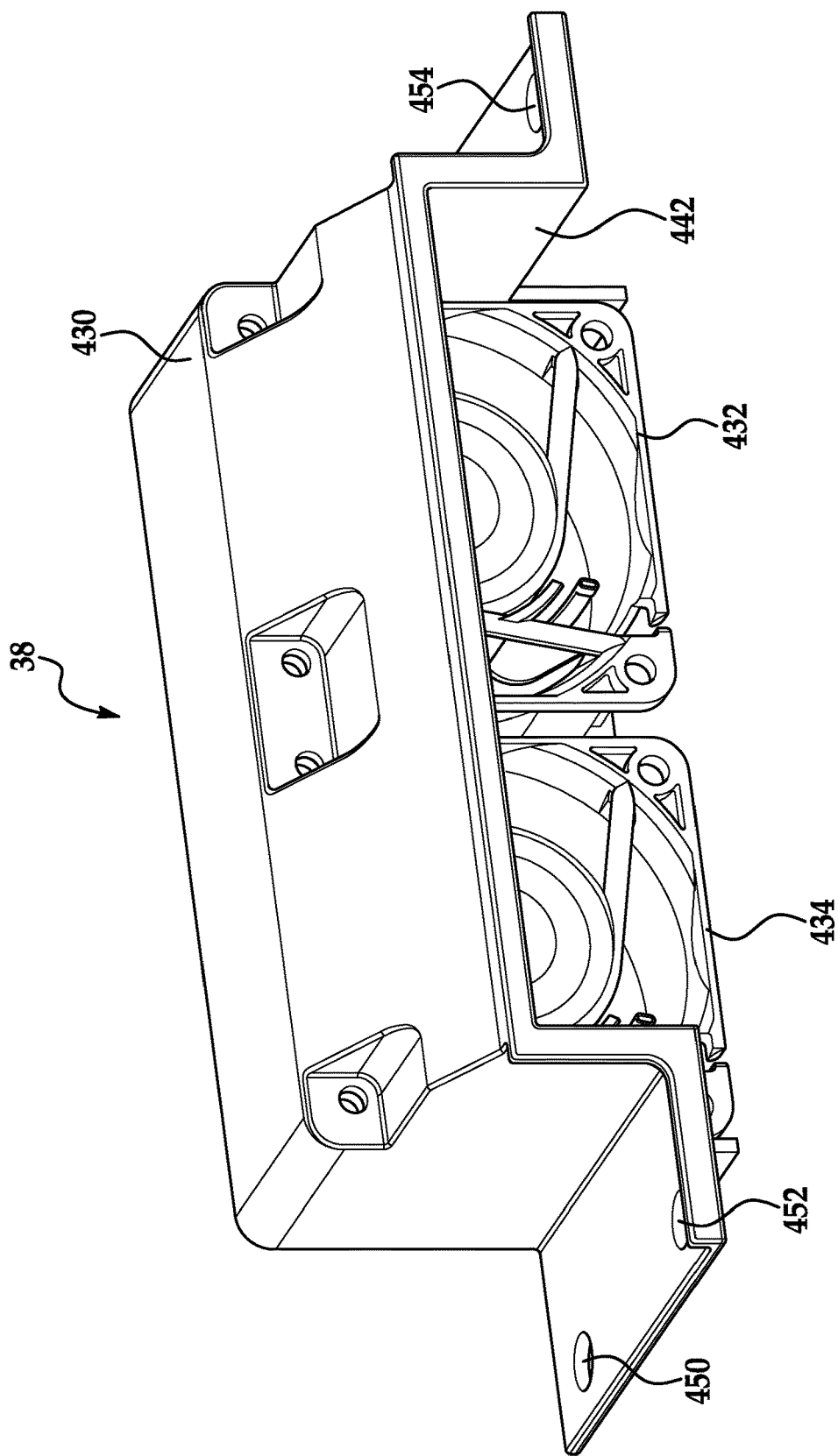
FIG. 15 is another schematic of the electric fan assembly of FIG. 14.

Referring to FIGS. 9, 14 and 15, the electric fan assembly 38 is disposed in the interior region 128 (shown in FIG. 4) on the first and second substantially flat top walls 80, 82 of the base assembly 20. The electric fan assembly 38 is further disposed between the flow manifold 36 and the electronic assembly 40 and fluidly communicates with the flow path 44 (shown in FIG. 4). The electric fan assembly 38 is provided to urge air to flow through the inlet aperture 142 (shown in FIG. 1) of the cover assembly 22 and further through the plurality of flow channels in the battery modules 26, 28, 30, and the second flow path 44, and to exit the outlet aperture 144 (shown in FIG. 2) of the cover assembly 22. The electric fan assembly 38 includes a fan housing 430 and electric fans 432, 434 disposed in the fan housing 430. The fan housing 430 has a fan housing inlet aperture 440 and a fan housing outlet aperture 442. The fan housing 430 further includes apertures 450, 452, 454, 456 extending therethrough that are adapted to receive respective bolts therethrough for coupling the fan housing 430 to the base assembly 20.

Figure 16:
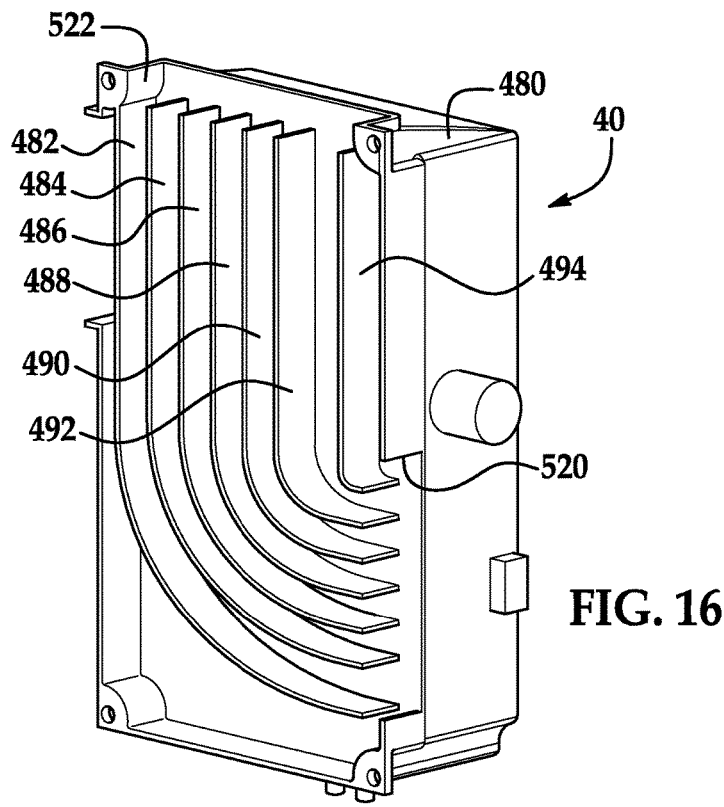
FIG. 16 is a schematic of an electronic assembly utilized in the battery pack of FIG. 1.
Figure 17:
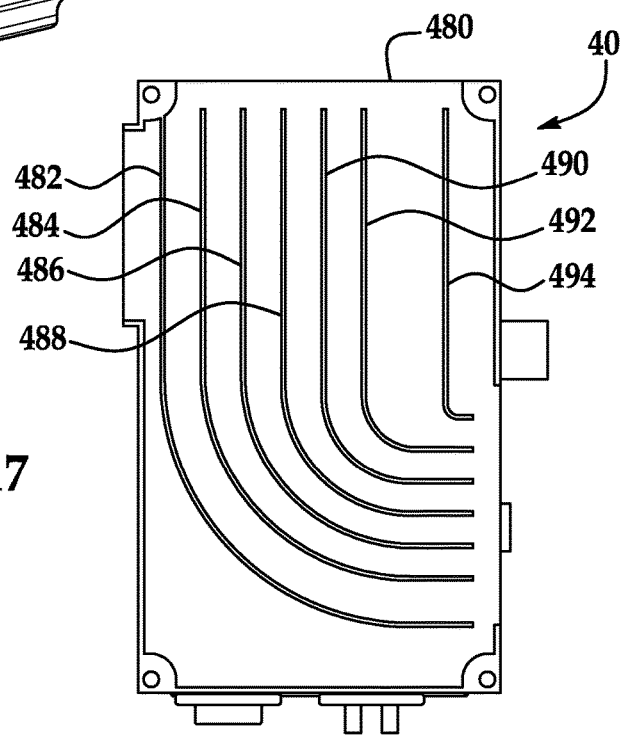
FIG. 17 is a bottom view of the electronic assembly of FIG. 16.

Referring to FIGS. 16 and 17, the electronic assembly 40 includes an electronic assembly housing 480, a DC-DC voltage converter (not shown) disposed in the housing 480 that is electrically coupled to the battery cells of the battery modules 26, 28, 30, and cooling fins 482, 484, 486, 488, 490 and 492. The electronic assembly 40 is disposed on the first and second substantially flat top walls 80, 82 (shown in FIG. 6) of the base assembly 20 proximate to the second end 102 of the base assembly 20 such that a portion of the flow path 44 extends underneath the electronic assembly 40. The cooling fins 482, 484, 486, 488, 490 and 492 extend outwardly from the electronic assembly housing 480. The cooling fins 482, 484, 486, 488, 490 and 492 fluidly communicate with the flow path 44 such that air flowing through the flow path 44 extracts heat energy from the cooling fins 482-492 to cool the electronic assembly 40. The electronic assembly housing 480 has an inlet aperture 520 and an outlet aperture 522. The inlet aperture 520 fluidly communicates with the electric fan assembly 38. The cooling fins 482-492 direct air from the inlet aperture 520 to the outlet aperture 522 that then exits the outlet aperture 144 (shown in FIG. 2) of the cover assembly 22. In an exemplary embodiment, the electronic assembly housing 480 is constructed of aluminum. Of course, in an alternative embodiment, the electronic assembly housing 480 can be constructed of other materials such as steel or other metal alloys for example.

The battery pack described herein provides a substantial advantage over other battery packs. In particular, an advantage of the battery pack is that the battery pack utilizes battery modules that are disposed at an acute angle relative to a base assembly which reduces a longitudinal length of the battery pack. A further advantage of the battery pack is that the battery pack has a substantially equal air flow through a plurality of flow channels in each of the battery modules therein for equally cooling the battery modules.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery pack, comprising:
a battery module having a bottom surface and a top surface; the battery module further having a plurality of flow channels extending through the battery module from the top surface to the bottom surface;
a base assembly adapted to hold the battery module at a tilted position thereon, the base assembly having a sheet member with a bottom wall, first and second upwardly slanted top walls, a first inner side wall, a second inner side wall, a first inner end wall, a first end, and a second end; the first and second upwardly slanted top walls being disposed apart from one another and extending in a first direction, the first direction extending from the first end to the second end of the sheet member; the first inner side wall being coupled directly to and between the bottom wall and the first upwardly slanted top wall and extending in the first direction, the second inner side wall being coupled directly to and between the bottom wall and the second upwardly slanted top wall and extending in the first direction, the first inner end wall being coupled directly to and between the first and second inner side walls and extending upwardly from the bottom wall, the first and second upwardly slanted top walls further extending at an acute angle relative to the bottom wall; the bottom wall being disposed between the first and second inner side walls and extending in the first direction; the bottom surface of the battery module being disposed directly on and directly contacting the first and second upwardly slanted top walls such that the bottom surface of the battery module is tilted and disposed at the acute angle relative to the bottom wall of the base assembly in the first direction and the plurality of flow channels in the battery module fluidly communicate with a first flow path, the first flow path being at least partially defined between the bottom wall of the base assembly, the first and second inner side walls, the first inner end wall, and the bottom surface of the battery module;
a cover assembly coupled to the base assembly such that battery module is disposed within an interior region defined by the cover assembly and the base assembly, the cover assembly having a top wall extending horizontally, the top wall of the cover assembly extending substantially parallel to the bottom wall of the base assembly, and a top surface of the battery module being disposed at an acute angle relative to the top wall of the cover assembly in a second direction opposite to the first direction; and a second flow path being defined between the top surface of the battery module and the top wall of the cover assembly;
an electronic assembly being disposed directly on the base assembly proximate to the second end of the base assembly such that a portion of the first flow path extends underneath the electronic assembly;
an electric fan assembly being disposed in the interior region and between the battery module and the electronic assembly in the first direction; the electric fan assembly fluidly communicating with the first flow path; the electric fan assembly being adapted to urge air to flow through an inlet aperture of the cover assembly, and through the second flow path, and the plurality of flow channels of the battery module, and the first flow path, and to exit an outlet aperture of the cover assembly.

2. The battery pack of claim 1, wherein an amount of the air flowing through each flow channel of the plurality of flow channels is substantially equal to one another.

3. The battery pack of claim 1, wherein the electronic assembly includes an electronic assembly housing and a plurality of cooling fins extending outwardly from the electronic assembly housing, the plurality of cooling fins fluidly communicating with the first flow path, such that the air flowing through the first flow path extracts heat energy from the plurality of cooling fins to cool the electronic assembly.

4. The battery pack of claim 3, wherein the electronic assembly housing has an inlet aperture and an outlet aperture, the inlet aperture of the electronic assembly housing fluidly communicating with the electric fan assembly, the plurality of cooling fins directing the air from the inlet aperture of the electronic assembly housing to the outlet aperture of the electronic assembly housing.

5. The battery pack of claim 4, wherein the cover assembly has a cover assembly inlet aperture and a cover assembly outlet aperture, the cover assembly inlet aperture directly fluidly communicating with the second flow path, the cover assembly outlet aperture directly fluidly communicating with the outlet aperture of the electronic assembly housing.

6. The battery pack of claim 3, wherein the electric fan assembly includes a fan housing and a first electric fan disposed in the fan housing, the fan housing having a fan housing inlet aperture and a fan housing outlet aperture.

7. The battery pack of claim 6, wherein the electric fan assembly further includes a second electric fan disposed in the fan housing.

8. The battery pack of claim 6, wherein the fan housing outlet aperture fluidly communicates with the plurality of cooling fins of the electronic assembly.

9. The battery pack of claim 1, further comprising a flow manifold disposed on the base assembly between the battery module and the electric fan assembly such that a portion of the first flow path extends underneath the flow manifold, the flow manifold having a flow manifold inlet and a flow manifold outlet aperture, the flow manifold inlet fluidly communicating with the battery module, the flow manifold outlet aperture fluidly communicating with the electric fan assembly.

10. The battery pack of claim 1, wherein the sheet member of the base assembly further includes first and second substantially flat top walls extending from the first and second upwardly slanted top walls, respectively, substantially in the first direction; the first and second substantially flat top walls being substantially parallel to the bottom wall;
the first inner side wall being further coupled to and between the bottom wall and the first substantially flat top wall;
the second inner side wall being further coupled to and between the bottom wall and the second substantially flat top wall; and
the electronic assembly being disposed on the first and second substantially flat top walls of the base assembly.

11. The battery pack of claim 10, wherein the electric fan assembly being disposed on the first and second substantially flat top walls of the base assembly.

12. The battery pack of claim 11, wherein the electronic assembly being disposed on the first and second substantially flat top walls of the base assembly.

13. The battery pack of claim 1, wherein the first and second upwardly slanted top walls extend substantially parallel to one another.

* * * * *